United States Patent
Sugiyama

(10) Patent No.: US 10,254,692 B1
(45) Date of Patent: Apr. 9, 2019

(54) IMAGE FORMING APPARATUS AND METHOD OF CONTROLLING RETURN FROM SLEEP MODE IN IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Hiroyuki Sugiyama, Mishima Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/919,018

(22) Filed: Mar. 12, 2018

(51) Int. Cl.
*G03G 15/00* (2006.01)
*G03G 15/20* (2006.01)
*G06F 1/32* (2019.01)
*G03G 15/16* (2006.01)
*G06F 3/12* (2006.01)
*G06K 15/16* (2006.01)

(52) U.S. Cl.
CPC ......... *G03G 15/2053* (2013.01); *G03G 15/16* (2013.01); *G03G 15/602* (2013.01); *G03G 15/6555* (2013.01); *G06F 1/32* (2013.01); *G06F 3/1201* (2013.01); *G06K 15/16* (2013.01)

(58) Field of Classification Search
CPC ............. G03G 15/2053; G03G 15/205; G03G 15/5004; G03G 15/16; G03G 15/602; G03G 15/6555; H04N 1/00885; H04N 1/00888; H04N 1/00891; H04N 1/00904; G06F 1/32; G06F 1/3284; G06F 3/1201; G06K 15/16

See application file for complete search history.

(56) References Cited

U.S. PATENT DOCUMENTS

| | | | |
|---|---|---|---|
| 2010/0128301 A1* | 5/2010 | Bisset | B41J 2/0057 358/1.15 |
| 2012/0292510 A1* | 11/2012 | Tanaka | G01V 9/005 250/338.3 |
| 2014/0092414 A1* | 4/2014 | Tezuka | H04N 1/00395 358/1.13 |

(Continued)

FOREIGN PATENT DOCUMENTS

JP  2007-279603 A  10/2007

*Primary Examiner* — Sophia S Chen
(74) *Attorney, Agent, or Firm* — Foley & Lardner LLP

(57) ABSTRACT

A detection unit detects a presence of an individual near an image forming apparatus during a sleep mode in which an image forming unit, an image reading unit, and a user interface unit enter a sleep state of non-conduction. An individual specifying unit specifies the individual detected by the detection unit. A determination unit determines whether there is a printing job corresponding to the individual specified by the individual specifying unit. A control unit warms up a heater by causing the fixer to transition from the sleep state to a ready state when the determination unit determines that there is the printing job corresponding to the individual specified by the individual specifying unit. Conversely, the control unit maintains the fixer in the sleep state when the determination unit determines that there is no printing job corresponding to the individual specified by the individual specifying unit.

18 Claims, 5 Drawing Sheets

(56) References Cited

U.S. PATENT DOCUMENTS

| | | | | |
|---|---|---|---|---|
| 2014/0098394 A1* | 4/2014 | Tanisaki | H04N 1/00323 | |
| | | | | 358/1.13 |
| 2014/0104636 A1* | 4/2014 | Baba | H04N 1/00891 | |
| | | | | 358/1.14 |
| 2015/0253719 A1* | 9/2015 | Matsumoto | G03G 15/5004 | |
| | | | | 399/75 |
| 2015/0261159 A1* | 9/2015 | Horishita | G03G 15/5004 | |
| | | | | 399/88 |
| 2017/0094069 A1* | 3/2017 | Kanemitsu | H04N 1/00891 | |

* cited by examiner

IMAGE FORMING APPARATUS AND METHOD OF CONTROLLING RETURN FROM SLEEP MODE IN IMAGE FORMING APPARATUS

FIELD

Embodiments described herein relate generally to an image forming apparatus and a method of controlling return from a sleep mode in the image forming apparatus.

BACKGROUND

Image forming apparatuses perform printing in response to a printing request (printing job). The image forming apparatuses form images on printing media (paper sheets) such as paper and discharge the printing media on which the images are formed. The image forming apparatuses include transport units that transport printing media and image forming units that form images on printing media being transported.

For example, the image forming units form latent images (electrostatic latent images) on photoconductive drums by charging the photoconductive drums and radiating light according to printing image data (printing data during a printing job) to the photoconductive drums. The image forming units stick toner (developer) to the latent images formed on the photoconductive drums and transfer the toner stuck to the latent images to printing media through transfer belts to form toner images on the printing media. The image forming units include fixers that include heaters and fixing rollers. The fixers form the images on the printing media by fixing the toner images formed on the printing media, with the printing media on which the toner images are formed nipped between the fixing rollers heated at a high temperature by the heater.

In the image forming apparatuses, when there is no printing request for a given time, units of the image forming apparatuses transition from a ready state in which images can be formed to a sleep state in which conductivity to the heaters is stopped or display of display units is erased, and thus power saving is achieved.

In such image forming apparatuses, when approach of an individual to the image forming apparatus is detected by a camera, individual authentication is performed by matching an image of the individual captured by the camera with an individual image registered in advance. When the individual is a person permitted to use the image forming apparatus, each unit is returned from the sleep state to the ready state. However, it may not be said that the individual approaching the image forming apparatus necessarily uses the image forming apparatus. For this reason, even when the image forming apparatus is not used, a warming-up operation of the heater occurs. Thus, unnecessary power consumption occurs.

Accordingly, there is a request for an image forming apparatus that does not unnecessarily consume power.

DETAILED DESCRIPTION

In general, according to one embodiment, an image forming apparatus includes an image forming unit that forms an image on an image forming medium, an image reading unit that reads the image, and a user interface unit (an interface) that receives a user selection of scanning or copying and having printing, scanning, and copying functions. An image forming unit includes a fixer that includes a heater. The image forming apparatus further includes a detection unit, an individual specifying unit, a determination unit, and a control unit. The detection unit detects a presence of an individual near the image forming apparatus during a sleep state in which the image forming unit, the image reading unit, and the user interface unit are not conducted. The individual specifying unit specifies the individual detected by the detection unit. The determination unit determines whether there is a printing job corresponding to the individual specified by the individual specifying unit. The control unit warms up the heater by causing the fixer to transition from the sleep state to a ready state when the determination unit determines that there is the printing job corresponding to the individual specified by the individual specifying unit. Conversely, the control unit maintains the fixer in the sleep state when the determination unit determines that there is no printing job corresponding to the individual specified by the individual specifying unit.

Hereinafter, embodiments will be described with reference to the drawings.

First Exemplary Embodiments

Figure 1:
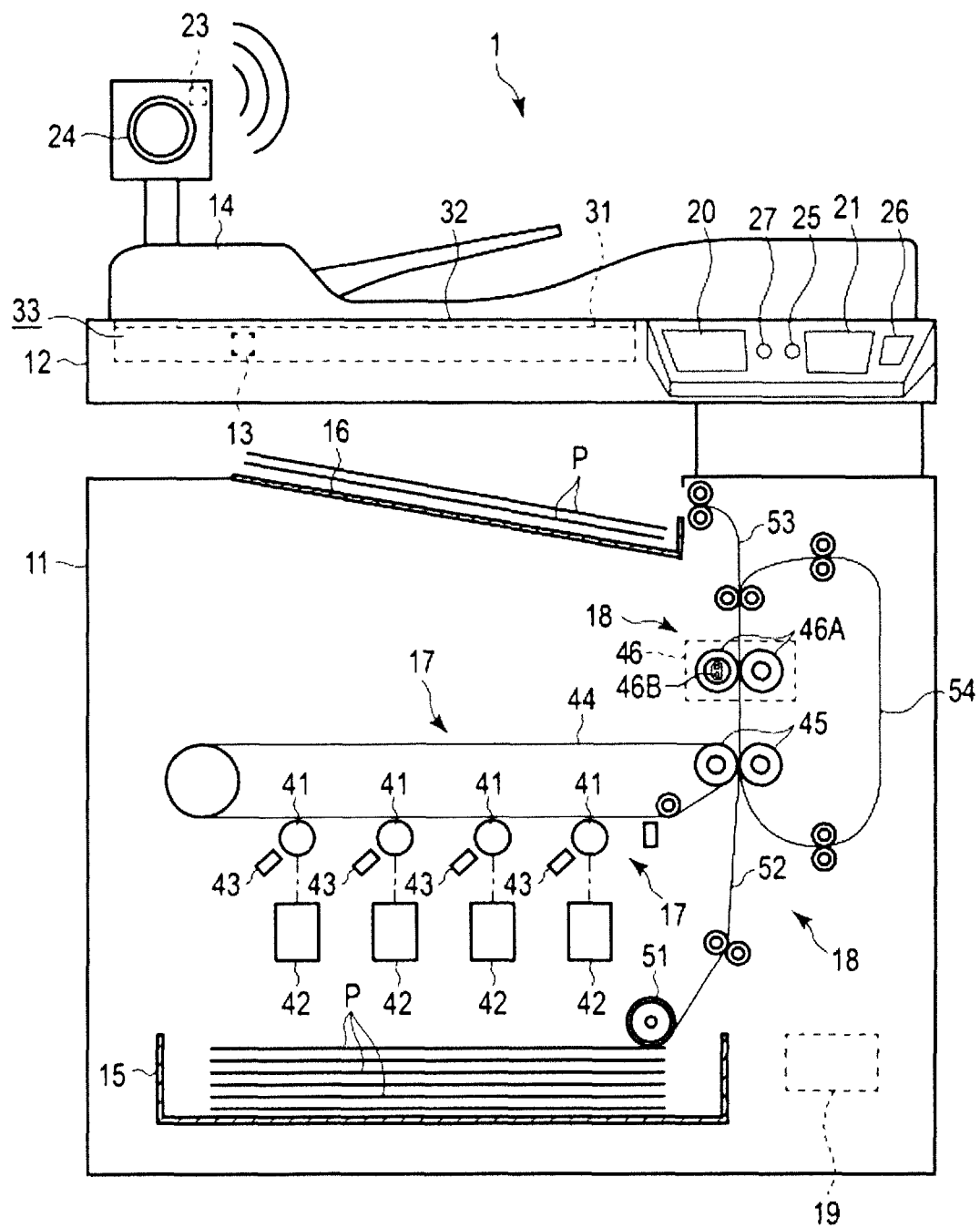
FIG. 1 is a diagram illustrating a mechanical configuration of an example of an image forming apparatus according to at least one embodiment.
Figure 2:
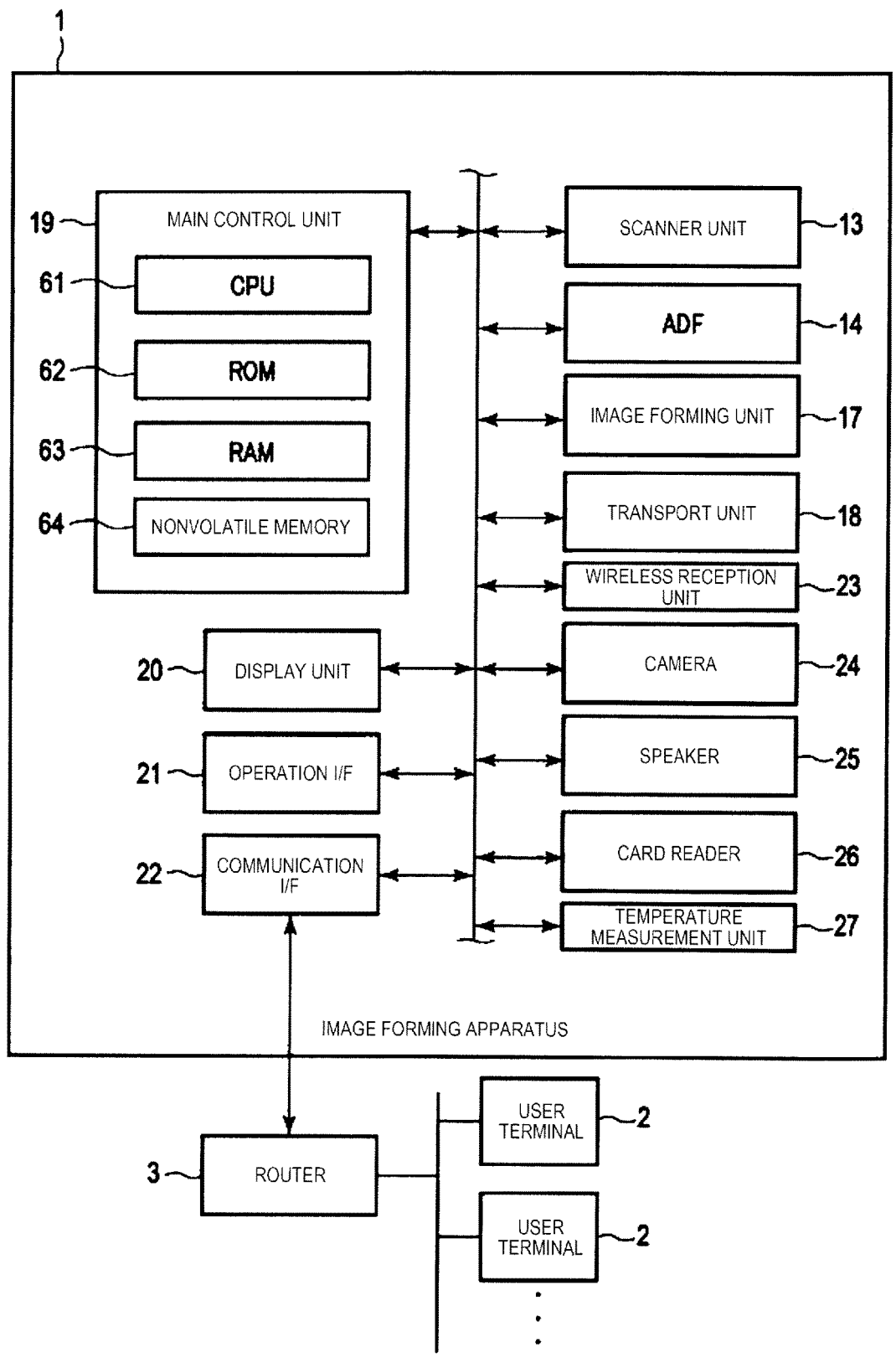
FIG. 2 is a block diagram illustrating an electric configuration of an example of the image forming apparatus according to at least one embodiment.

FIG. 1 is a diagram illustrating a mechanical configuration of an example of an image forming apparatus according to one or more exemplary first embodiments. FIG. 2 is a block diagram illustrating an electric configuration of an example of the image forming apparatus according to the one or more first exemplary embodiments.

An image forming apparatus 1 according to the one or more first exemplary embodiments is a multi-function peripheral (MFP) that has functions of a copying device, a scanner device, and a printer device. The image forming apparatus 1 may further include a function of a facsimile device.

The image forming apparatus 1 charges a photoconductive drum and forms a latent image (electrostatic latent image) on the photoconductive drum by radiating light according to printing image data (printing data) to the photoconductive drum. The image forming apparatus 1 sticks toner (developer) to the latent image formed on the photoconductive drum and transfers the toner stuck to the latent image to a printing medium to form a toner image on the printing medium. In the image forming apparatus 1, a fixer fixes the toner image formed on the printing medium, with the printing medium on which the toner image is formed nipped between the fixing rollers heated at a high temperature by the heater.

The image forming apparatus 1 acquires the image on the printing medium by causing an image sensor to form reflected light of the light radiated to the printing medium, reading charges stored in the image sensor, and converting the charges into a digital signal.

The image forming apparatus 1 has a function connected to a local area network. In the example of the configuration illustrated in FIG. 2, the image forming apparatus 1 is connected to a plurality of user terminals 2 in the local area network via a router 3. The user terminal 2 is a terminal apparatus that is used by a user. The user terminal 2 includes a processor, a memory, an interface, an operation, a display unit, and the like. The user terminal 2 performs data communication with each apparatus inside a local area network connected via the router 3. The user terminal 2 realizes various processing functions when a processor executes programs stored in a memory. The user terminal 2 is, for example, a personal computer. The user terminal 2 may be a portable terminal apparatus capable of communicating with the image forming apparatus 1.

The image forming apparatus 1 includes a casing 11, an original table 12, a scanner unit (a scanner) 13, an automatic document feeder (ADF) 14, a feeding cassette 15, a discharging tray 16, an image forming unit (an image former) 17, a transport unit (a transporter) 18, a main control unit (a main controller) 19, a display unit (a display) 20, an operation I/F 21, a communication I/F 22, a wireless reception unit (a receiver) 23, a camera 24, a speaker 25, a card reader 26, and a temperature measurement unit (a temperature sensor) 27.

The casing 11 is a body that holds the original table 12, the scanner unit 13, the ADF 14, the feeding cassette 15, the discharging tray 16, the image forming unit 17, the transport unit 18, the main control unit 19, the display unit 20, the operation I/F 21, the communication I/F 22, the wireless reception unit 23, the camera 24, the speaker 25, the card reader 26, and the temperature measurement unit 27.

The original table 12 is a unit on which an original medium is placed. The original table 12 includes a glass plate 31 on which an original medium is placed and a space 33 that is located on an opposite surface to a placement surface 32 of the glass plate 31.

The ADF 14 is a mechanism that transports an original medium. The ADF 14 is installed on the original table 12 to be openable and closable. The ADF 14 takes an original disposed in a tray under the control of the main control unit 19 and transports the taken original medium while bringing the original medium into close contact with the glass plate 31 of the original table 12.

The scanner unit 13 acquires an image from the original medium under the control of the main control unit 19. The scanner unit 13 is disposed in the space 33 on the opposite side to the placement surface 32 of the original table 12. The scanner unit 13 includes an image sensor, an optical element, and an illumination.

The image sensor is an imaging element in which pixels converting light into an electric signal (image signal) are arrayed in a line shape. The image sensor includes, for example, a charge coupled device (CCD), a complementary metal oxide semiconductor (CMOS), or another imaging element.

The optical element forms light from a predetermined reading range to the pixels of the image sensor. The reading range of the optical element is a region that has a line shape on the placement surface 32 of the original table 12. The optical element reflects light reflected from the original medium placed on the placement surface 32 of the original table 12 and transmitted through the glass plate 31 as an image on the pixels of the image sensor.

The illumination radiates light to the original medium. The illumination includes a light source and a light guiding body that radiates light from the light source to the original medium. The illumination radiates the light emitted from the light source to a region including the reading range of the optical element by the light guiding body.

When the original medium is placed on the placement surface 32 of the original table 12, the scanner unit 13 is driven by a driving mechanism (not illustrated) in a sub-scanning direction which is a direction orthogonal to an array direction (main scanning direction) of the pixels of the image sensor and parallel to the placement surface 32. The scanner unit 13 is driven in the sub-scanning direction and acquires image data (original image data) of the whole original medium placed on the placement surface 32 of the original table 12 by continuously acquiring images for each line by the image sensor.

When the original medium is transported by the ADF 14, the scanner unit 13 is driven to a position facing a position at which the original medium is brought into close contact with the glass plate 31 by the ADF 14. The scanner unit 13 acquires the image data (the original image data) of the whole original medium transported by the ADF 14 by continuously acquiring images for each line by the image sensor from the original medium transported by the ADF 14.

The feeding cassette 15 is a cassette that accommodates a printing medium P on which an image is to be formed. The feeding cassette 15 can supply the printing medium P from the outside of the casing 11. For example, the feeding cassette 15 can be extracted from the casing 11.

The discharging tray 16 is a tray that supports the printing medium P discharged from the image forming apparatus 1.

The image forming unit 17 forms an image on the printing medium P under the control of the main control unit 19. For example, the image forming unit 17 charges a drum, forms a latent image according to printing image data (printing data) on the charged drum, sticks toner to the latent image formed on the drum, transfers the toner stuck to the latent image to the printing medium P, and forms the image on the printing medium P. The image forming unit 17 includes, drums 41, exposure units 42, developers 43, a transfer belt 44, one pair of transfer rollers 45, and a fixer 46 that includes one pair of fixing rollers 46A and a heater 46B, for example, as illustrated in FIG. 1.

The drum 41 is a photoconductive drum that is formed in a cylindrical shape. The drum 41 is installed to come into contact with the transfer belt 44. The surface of the drum 41 is evenly charged by a charged charger (not illustrated). The drum 41 is rotated at a constant speed by a driving mechanism (not illustrated).

The exposure unit 42 forms an electrostatic latent image on the charged drum 41. The exposure unit 42 forms the electrostatic latent image on the surface of the drum 41 by causing a light-emitting element or the like to radiate a laser beam to the surface of the drum 41 according to the printing data. The exposure unit 42 includes a light-emitting unit and an optical element.

The light-emitting unit has a configuration in which light-emitting elements that emit light according to an electric signal (image signal) are arrayed in a line shape. The light-emitting elements of the light-emitting unit emit light with a wavelength capable of forming the latent image on the charged drum 41. The light emitted from the light-emitting unit is formed as an image on the surface of the drum 41 by the optical element.

The developer 43 sticks toner (developer) to the electrostatic latent image formed on the drum 41. Thus, the developer 43 forms an image of the toner (toner image) on the surface of the drum 41.

For example, the drum 41, the exposure unit 42, the developer 43 of the image forming unit 17 are formed for each different color such as cyan, magenta, yellow, and black. In this case, the plurality of developers 43 holds toner with each different color.

The transfer belt 44 is a member that receives the toner image formed on the surface of the drum 41 and transfers the toner image to the printing medium P. The transfer belt 44 is moved by rotating the rollers. The transfer belt 44 receives the toner image formed on the drum 41 at a position at which the transfer belt 44 comes into contact with the drum 41 and conveys the received toner image to one pair of transfer rollers 45.

One pair of transfer rollers 45 is configured such that the printing medium P is nipped between the transfer rollers 45 and the transfer belt 44. One pair of transfer rollers 45 transfer the toner image on the transfer belt 44 to the printing medium P.

In the fixer 46, one pair of fixing rollers 46A are configured such that the printing medium P is nipped between the fixing rollers 46A. One pair of fixing rollers 46A are heated by the heater 46B. One pair of fixing rollers 46A fix the toner image formed on the printing medium P by applying pressure to the nipped printing medium P in the heated state. That is, one pair of fixing rollers 46A form an image on the printing medium P by fixing the toner image.

The transport unit 18 includes, for example, an intake roller 51, a feeding transport path 52, a discharging transport path 53, and a reversing transport path 54, as illustrated in FIG. 1.

The intake roller 51 takes the printing medium P accommodated in the feeding cassette 15 into the feeding transport path 52.

The feeding transport path 52 is a transport path along which the printing medium P taken from the feeding cassette 15 by the intake roller 51 is transported to the image forming unit 17.

The discharging transport path 53 is a transport path along which the printing medium P on which the image is formed by the image forming unit 17 is discharged from the casing 11.

The printing medium P discharged along the discharging transport path 53 is discharged to the discharging tray 16.

The reversing transport path 54 is a transport path along which the printing medium P is supplied to the image forming unit 17 when the front and rear surfaces and the front and back of the printing medium P on which the image is formed by the image forming unit 17 is reversed. The main control unit 19 controls the image forming apparatus 1. The main control unit 19 includes, for example, a CPU 61, a ROM 62, a RAM 63, and a nonvolatile memory 64.

The CPU 61 is an arithmetic element (for example, a processor) that performs arithmetic processing. The CPU 61 performs various processes based on data such as a program stored in the ROM 62 or the nonvolatile memory 64. The CPU 61 functions as a control unit (a controller) capable of performing various operations by executing a program stored in the ROM 62 or the nonvolatile memory 64. The CPU 61 inputs printing data for forming an image on the printing medium P to the image forming unit 17. The CPU 61 inputs a transport control signal for giving an instruction to transport the printing medium P to the transport unit 18.

The ROM 62 is a read-only nonvolatile memory. The ROM 62 stores a program and data which is used for the program.

The RAM 63 is a volatile memory that functions as a working memory. The RAM 63 temporarily stores data or the like which is being processed by the CPU 61. The RAM 63 temporarily stores a program which is executed by the CPU 61.

The nonvolatile memory 64 is a storage medium (storage unit) capable of storing various kinds of information. The nonvolatile memory 64 stores a program and data or the like which is used for the program. The nonvolatile memory 64 is, for example, a solid-state drive (SSD), a hard disk drive (HDD), or another storage device. Instead of the nonvolatile memory 64, a memory I/F such as a card slot into which a storage medium such as a memory card can be inserted may be installed.

The display unit 20 includes a display that displays a screen according to a video signal input from the main control unit 19 or a display control unit such as a graphic controller (not illustrated). For example, a screen for various kinds of setting of the image forming apparatus 1 is displayed on the display of the display unit 20.

The operation I/F 21 is connected to an operation member (not illustrated). The operation I/F 21 supplies an operation signal according to an operation on the operation member to the main control unit 19. The operation member is, for example, a touch sensor, a numeric key, a power key, a sheet-feeding key, any of various function keys, or a keyboard. The touch sensor is, for example, a resistant film type touch sensor or a capacitance type touch sensor. The touch sensor acquires information indicating a position designated in a certain region. The touch sensor is a touch panel integrated with the display unit 20 and inputs a signal indicating a position touched on a screen displayed on the display unit 20 to the main control unit 19.

The communication I/F 22 is an interface for communicating with another apparatus. The communication I/F 22 is used for, for example, communication with the user terminal 2 transmitting a printing job to the image forming apparatus 1. The communication I/F 22 is, for example, a LAN connector. The communication I/F 22 may perform wireless communication with another apparatus in conformity with Bluetooth (registered trademark) or Wi-Fi (registered trademark). The printing job received by the communication I/F 22 is stored in the RAM 63 in association with an identifier for specifying the user terminal 2 of a transmission source, that is, a user using the user terminal 2.

The wireless reception unit 23 is an interface for performing wireless communication with an ID card carried by a user of the image forming apparatus 1 in conformity with the Bluetooth or Wi-Fi standard or the like. The wireless reception unit 23 transmits and receives data to and from the IC card through contactless communication.

The IC card includes a communication circuit (an authenticator or authentication circuit) for communication with an IC chip. The IC chip includes a CPU, a ROM, a RAM, and a nonvolatile memory. The nonvolatile memory of the IC chip stores identification information indicating a user carried by the IC card and authentication information for individual authentication. The communication circuit is, for example, an antenna or a contact terminal (contact pattern).

The communication circuit continuously transmits identification information from the antenna with power with which the wireless reception unit 23 receives the identification information when the user approaches the vicinity of the image forming apparatus 1. The communication circuit continuously transmits the authentication information from the antenna with power which is less than the power used to transmit the identification information. Alternatively, the authentication information may be output to the card reader 26 when the communication circuit is electrically or magnetically connected to the card reader 26 without performing wireless communication.

The camera 24 acquires a face photo of a person operating the image forming apparatus 1. The camera 24 includes an image sensor and an optical element.

The image sensor is an imaging element in which pixels converting light into an electric signal (image signal) are arrayed in a line shape. The image sensor includes, for example, a CCD, a CMOS, or another imaging element.

The optical element forms light from a predetermined reading range to the pixels of the image sensor. The reading range of the optical element is a predetermine range near the image forming apparatus 1 and is a range in which the face of the user operating the image forming apparatus 1 is shown.

The speaker 25 outputs a sound according to a sound signal input from the main control unit 19. For example, the speaker 25 outputs an alert as a sound for the user operating the image forming apparatus 1.

The card reader 26 is an interface for performing communication with an IC card carried by the user of the image forming apparatus 1. The card reader 26 acquires authentication for individual authentication of the user carrying the IC card from the IC card by communicating with the IC card through contact communication or contactless communication.

The temperature measurement unit 27 (a temperature sensor) includes a thermometer that measures a temperature of an environment in which the image forming apparatus 1 is installed, for example, the room temperature.

In the image forming apparatus 1 with such a configuration, three states, a ready state, a preheating state, and a sleep state, can be adopted for the heater 46B that heats the fixing rollers 46A of the fixer 46. The ready state is a warm-up state in which the fixing rollers 46A of the fixer 46 are heated at a high temperature by the heater 46B. The sleep state is a state in which conductivity of the heater 46B is stopped and the fixing rollers 46A are not heated. The preheating state is a state in which the fixing rollers 46A are heated at a temperature lower than in the ready state. That is, power consumption of the three states has a relation of the ready state >the preheating state >the sleep state.

In the ready state, the CPU 61 supplies power to the image forming unit 17 including the fixer 46 in addition to the fixer 46 including the heater 46B and further the scanner unit 13, the ADF 14, the transport unit 18, the display unit 20, the operation I/F 21, the communication I/F 22, the wireless reception unit 23, the camera 24, the speaker 25, the card reader 26, and the temperature measurement unit 27, that is, conducts each unit. That is, in the ready state, the CPU 61 maintains each unit of the image forming apparatus 1 so that each unit can operate.

The CPU 61 switches a state of the image forming apparatus 1 from the ready state to a sleep mode according to a predetermined operation, a time elapsed from final image formation, or received data. For example, when the CPU 61 receives an instruction to switch the image forming apparatus 1 to the sleep mode from an external apparatus via the communication I/F 22, a time elapsed from final image formation becomes a predetermined time or more, or an operation to give an instruction to switch the image forming apparatus 1 to the sleep mode is input by the operation I/F 21, the CPU 61 switches the state of the image forming apparatus 1 from the ready state to the sleep mode.

In the sleep mode, the CPU 61 stops supplying the power to the image forming unit 17 including the heater 46B, that is, stops the conduction, and causes the image forming unit 17 to enter the sleep state. Further, the CPU 61 stops supplying the power to the scanner unit 13, the ADF 14, the transport unit 18, the display unit 20, the speaker 25, and the temperature measurement unit 27, that is, stops the conduction to each of the units, and causes each unit to enter the sleep state. In the sleep mode, the power is continuously supplied to the operation I/F 21, the communication I/F 22, the wireless reception unit 23, the camera 24, and the card reader 26.

When a user approaches the vicinity of the image forming apparatus 1, the CPU 61 serves as an individual specifying circuit which is configured to specify an individual by recognizing the person and switches the state of the image forming apparatus 1 from the sleep mode to the ready state depending on whether there is a printing job of the specified individual. Therefore, an individual specifying information DB is stored in the nonvolatile memory 64 and individual specifying information regarding each user using the image forming apparatus 1 is registered in advance in the individual specifying information DB.

For example, the CPU 61 specifies the user approaching the image forming apparatus 1 through face authentication. In this case, a face feature extracted from a face image of a person and identification information for identifying the person are registered in advance as the individual specifying information in the individual specifying information DB. When a person approaches the image forming apparatus 1, the CPU 61 causes the camera 24 to acquire a face image of the person approaching the image forming apparatus 1, compares the acquired face image with a plurality of face features registered as the individual specifying information in the individual specifying information DB, and specifies one face feature according to a comparison result. For example, the CPU 61 calculates each similarity between the acquired face image and the plurality of face features which are the individual specifying information and specifies the face feature for which the highest similarity is calculated. Then, the CPU 61 recognizes the identification information associated with the specified face feature in the individual specifying information registered in the individual specifying information DB. The approaching person can be specified with the recognized identification information.

Alternatively, the CPU 61 specifies the user approaching the image forming apparatus 1 when the CPU 61 receives the identification information of the user. In this case, the identification information for identifying each person is registered in advance as the individual specifying information in the individual specifying information DB of the nonvolatile memory 64. Then, when the person approaches the image forming apparatus 1, the CPU 61 specifies the approaching person by causing the wireless reception unit 23 to acquire the identification information transmitted from an IC chip of the IC card carried by the person approaching the image forming apparatus 1 and comparing the acquired identification information with the plurality of identification information registered as the individual specifying information in the individual specifying information DB.

The CPU 61 switches the state of the image forming apparatus 1 from the sleep mode to the ready state depending on whether there is a printing job corresponding to the individual specified in this way. For example, when the printing job of the specified individual is received from an external apparatus via the communication I/F 22, the CPU 61 switches the state of each unit of the image forming apparatus 1 from the sleep state to the ready state. For example, when the printing job of the specified individual is not received, the CPU 61 maintains at least the fixer 46 including the heater 46B in the sleep state and switches the state of each unit of excluding the sleep state from the sleep state to the ready state.

When the printing job of the specified individual is not received, for example, when an operation to instruct copying is input by the operation I/F 21, the CPU 61 switches at least the fixer 46 including the heater 46B maintained in the sleep state from the sleep state to the ready state.

When the printing job of the specified individual is not received and at least the fixer 46 including the heater 46B is maintained in the sleep state, for example, an environmental temperature measured by the temperature measurement unit 27 is set to be lower than a set temperature in some cases. In this case, the CPU 61 can also switch at least the fixer 46 including the heater 46B maintained in the sleep state from the sleep state to the preheating state and cause the heater 46B to heat the fixing rollers 46A to a temperature lower than in the ready state.

Actual transition from the sleep mode to the ready state is preferably performed after individual authentication is performed on the approaching person. Therefore, an individual authentication information DB 64B is stored in the nonvolatile memory 64 and individual authentication information regarding each user using the image forming apparatus 1 is registered in advance in the individual authentication information DB 64B. Alternatively, individual authentication information common to all the users may be registered simply in the individual authentication information DB 64B. When the identification information stored in the IC chip of the IC card for the person approaching the image forming apparatus 1 is read by the card reader 26, the CPU 61 performs individual authentication by comparing the read identification information with the identification information corresponding to the specified individual or the identification information common to all the users registered in the individual authentication information DB 64B. For the individual authentication, the user may input the identification information to the CPU 61 from the operation I/F 21 by inputting a key with an operation member without using the IC card. A fingerprint sensor may be installed instead of the card reader 26 so that the individual authentication can be performed through fingerprint authentication.

Figure 3:
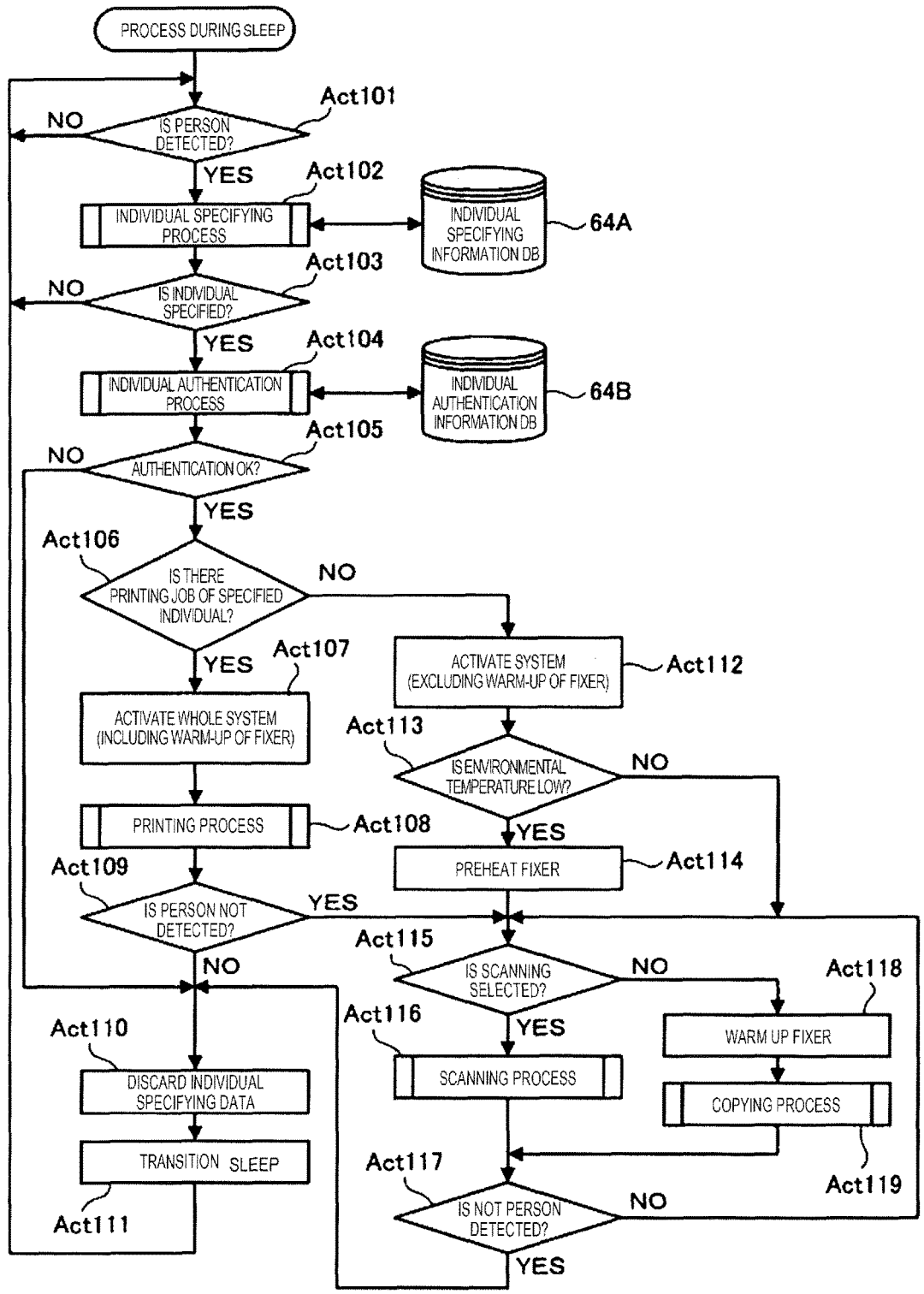
FIG. 3 is a flowchart illustrating an example of a process during sleep in the image forming apparatus according to at least one embodiment.

FIG. 3 is a flowchart illustrating an example of a process during sleep performed by the CPU 61. A control process illustrated in the flowchart is performed when the image forming apparatus 1 enters the sleep mode. That is, when the image forming apparatus 1 enters the sleep mode, the CPU 61 starts the control process illustrated in FIG. 3 according to a control program stored in the ROM 62 or the nonvolatile memory 64.

The CPU 61 serves as a determination circuit to determine a presence of an individual in proximity to the image forming apparatus 1. When the image forming apparatus 1 enters the sleep mode, the CPU 61 waits for a person to approach the image forming apparatus 1 (Act101). Whether the person approaches the image forming apparatus 1 is determined by determining whether the user near the image forming apparatus 1 is detected based on an output of the camera 24 or the wireless reception unit 23. When it is determined that the person approaches the image forming apparatus 1 (YES in Act 101), the CPU 61 performs an individual specifying process with reference to an individual specifying information DB 64A stored in the nonvolatile memory 64 (Act102). When the individual is specified in the individual specifying process, the CPU 61 stores the identification information for identifying the individual as individual specifying data in the RAM 63.

The CPU 61 determines whether the approaching person can be individually specified as a result of the individual specifying process (Act103). Here, when it is determined that the individual may not be specified, that is, the approaching person is determined not to be registered as a user using the image forming apparatus 1 (NO in Act103), the CPU 61 returns the control process to the foregoing Act101 and waits for another person to approach the image forming apparatus 1.

Conversely, when it is determined in the foregoing Act103 that the individual can be specified (YES in Act103), the CPU 61 performs the individual authentication process with reference to the individual authentication information DB 64B stored in the nonvolatile memory 64 (Act104). In the individual authentication process, the identification information which is referred to among the plurality of kinds of identification information registered in the individual authentication information DB 64B is determined based on the individual specifying data stored in the RAM 63. That is, the identification information of the specified individual is set as a target to perform the individual authentication. The CPU 61 determines whether to authenticate the specified individual who will use the image forming apparatus 1 as the result of the individual authentication process (Act105).

When it is determined that the individual authentication can be performed, that is, it is determined that the specified individual is registered as a user permitted to use the image forming apparatus 1 (YES in Act105), the CPU 61 determines whether there is a printing job of the individual specified in the foregoing Act102, that is, whether the printing job corresponding to the specified individual is stored in the RAM 63 (Act106).

When the CPU 61 determines that there is the printing job of the specified individual (YES in Act106), the CPU 61 activates the whole system (Act107). That is, the CPU 61 supplies power to the scanner unit 13, the ADF 14, the image forming unit 17, the transport unit 18, the display unit 20, the speaker 25, and the temperature measurement unit 27 of which the supply of the power has been stopped in the sleep mode. That is, the CPU 61 transitions each unit of the image forming apparatus 1 from the sleep state to the ready state. Thus, the fixer 46 of the image forming unit 17 is considered to be in a warm-up state in which the fixing rollers 46A are heated to a high temperature by the heater 46B. Thereafter, the CPU 61 performs a printing process suitable for the printing job of the specified individual (Act108).

After the printing ends, the CPU 61 determines whether the specified and recognized person is not detected, that is, the person become distant from the image forming apparatus 1 (e.g., is at least a predetermined distance or more from the image forming apparatus 1) by outputting information from the camera 24 or the wireless reception unit 23 (Act109). When it is determined that the person is not detected (NO in Act109), the CPU 61 discards the individual specifying data stored in the RAM 63 (Act110). Then, the CPU 61 stops supplying power to the scanner unit 13, the ADF 14, the image forming unit 17, the transport unit 18, the display unit 20, the speaker 25, and the temperature measurement unit 27 to transition each unit to the sleep state (Act111). Thereafter, the CPU 61 returns the control process to the foregoing Act101 and waits for another person to approach the image forming apparatus 1.

When it is determined in the foregoing Act109 that the person is still detected (YES in Act109), the CPU 61 causes the control process to proceed to Act115 to be described below. That is, on the assumption that the person who ends the printing and is not distant from the image forming apparatus 1 is the person attempting to perform a job other than the printing, that is, a scanning or copying job, the CPU 61 causes the process to proceed to a control process for the scanning or copying job.

When it is determined in the foregoing Act106 that there is no printing job of the specified individual (NO in Act106), the CPU 61 activates the system excluding at least the fixer 46 of the image forming unit 17 (Act112). That is, the CPU 61 maintains at least the fixer 46 including the heater 46B in the sleep state and transitions each unit excluding the fixer 46, that is, the states of the scanner unit 13, the ADF 14, the transport unit 18, the display unit 20, the speaker 25, and the temperature measurement unit 27 from the sleep state to the ready state.

Subsequently, the CPU 61 determines whether the current environmental temperature measured by the temperature measurement unit 27 is lower than a given temperature determined in advance (Act113). When it is determined that the environmental temperature is lower than the given temperature (YES in Act113), the CPU 61 switches the fixer 46 in the sleep state to the preheating state and causes the heater 46B to heat the fixing rollers 46A to a temperature lower than in the ready state (Act114). Conversely, when it is determined that the environmental temperature is equal to or greater than the given temperature (NO in Act113), the CPU 61 skips the control process of Act114.

Subsequently, the CPU 61 determines whether the specified and authenticated individual selects the scanning operation, that is, an operation to instruct scanning, is input from the operation I/F 21 (Act115). When it is determined that the scanning operation is selected (YES in Act115), the CPU 61 performs the scanning operation (Act116). Thereafter, the CPU 61 determines whether the specified and recognized person is not detected, that is, the person becomes distant from the image forming apparatus 1 by outputting information from the camera 24 or the wireless reception unit 23 (Act117). When it is determined that the person is not detected (YES in Act117), the CPU 61 causes the control process to proceed to the foregoing Act110 and discards the individual specifying data stored in the RAM 63. Conversely, when it is determined that the person is detected (NO in Act117), the CPU 61 returns the control process to the foregoing Act115.

Conversely, when it is determined in the foregoing Act115 that the scanning operation is not selected, that is, the copying operation is selected (NO in Act115), the CPU 61 switches the fixer 46 in the sleep state or the preheating state to the warm-up state and causes the heater 46B to heat the fixing rollers 46A to a high temperature (Act118). Then, the CPU 61 performs the copying operation (Act119). Thereafter, the CPU 61 returns the control process to the foregoing Act117 and determines whether the person becomes distant from the image forming apparatus 1.

When it is determined in the foregoing Act105 that the individual may not be authenticated, that is, it is determined that the specified individual is not registered as the user permitted to use the image forming apparatus 1 (NO in Act105), the CPU 61 causes the control process to proceed to the foregoing Act110 and discards the individual specifying data stored in the RAM 63. In this case, since the scanner unit 13, the ADF 14, the image forming unit 17, the transport unit 18, the display unit 20, the speaker 25, and the temperature measurement unit 27 are in the sleep state, nothing is actually performed in Act111 subsequently.

According to the above-described one or more first exemplary embodiments, it is possible to obtain the image forming apparatus 1 that does not unnecessarily consume power.

Second Exemplary Embodiments

An image forming apparatus 1 according to one or more second exemplary embodiments is an MFP as in the one or more first exemplary embodiments and has the same mechanical configuration as that of the one or more first exemplary embodiments. An electric configuration differs in that while the individual specifying data for one person is stored in the RAM 63 in the foregoing embodiment, individual specifying data for a plurality of people can be stored as an individual specifying table in the one or more second exemplary embodiments.

Figures 4, 5:
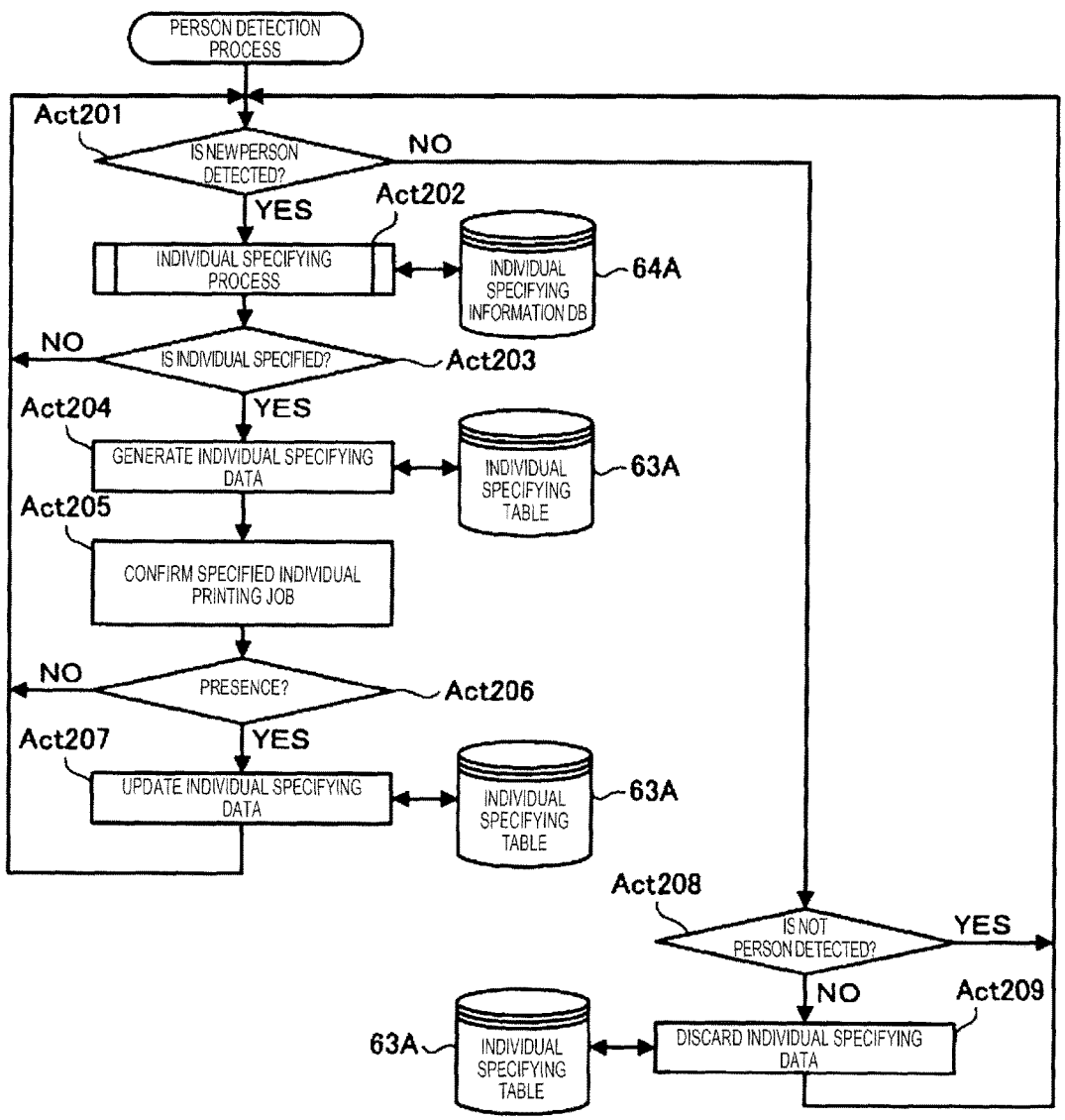
FIG. 4 is a diagram illustrating one storage example of an individual specifying table in an image forming apparatus according to at least a further embodiment.
FIG. 5 is a flowchart illustrating an example of a person detection process in the image forming apparatus according to at least a further embodiment.

FIG. 4 is a diagram illustrating one storage example of an individual specifying table 63A. The individual specifying table 63A stores a person number, identification information for identifying an individual, and whether there is a printing job for each individual as records of one piece of individual specifying data. The person number is numbered in a detection order.

FIG. 5 is a flowchart illustrating an example of a person detection process performed by the CPU 61 of the image forming apparatus 1 according to the one or more second exemplary embodiments. A control process illustrated in the flowchart is normally performed while the image forming apparatus 1 is activated without being in the sleep mode. That is, when the image forming apparatus 1 is powered on, the CPU 61 starts the control process illustrated in FIG. 5 according to a control program stored in the ROM 62 or the nonvolatile memory 64.

When the image forming apparatus 1 is powered on, the CPU 61 determines whether a new person is detected near the image forming apparatus 1 (Act201). By outputting information from the camera 24 (a detector) or the wireless reception unit 23, it is determined whether a person who has not been detected until then is newly detected. When it is determined that the new person is detected near the image forming apparatus 1 (YES in Act201), the CPU 61 performs the individual specifying process with reference to the individual specifying information DB 64A stored in the nonvolatile memory 64 (Act202).

The CPU 61 determines whether the newly detected person can be individually specified as a result of the individual specifying process (Act203). Here, when it is determined that the individual may not be specified, that is, the approaching person is determined not to be registered as a user using the image forming apparatus 1 (NO in Act203), the CPU 61 returns the control process to the foregoing Act201.

Conversely, when it is determined in the foregoing Act203 that the individual can be specified (YES in Act203), the CPU 61 generates a record of the individual specifying data (Act 204) including the identification information for identifying the individual and stores the record in the individual specifying table 63A of the RAM 63. In this case, since whether there is a printing job is not yet determined, "absence of printing job" is set as a default value.

Thereafter, the CPU 61 confirms whether the printing job corresponding to the specified individual is stored in the RAM 63 (Act205) and determines whether there is a corresponding printing job (Act206). Here, when it is determined that there is no corresponding printing job (NO in Act206), the CPU 61 returns the control process to the foregoing Act201.

When it is determined in the foregoing Act206 that the printing job corresponding to the individual specified in the foregoing Act206 is stored in the RAM 63 (YES in Act206), the CPU 61 updates the individual specifying data corresponding to the specified individual and stored in the individual specifying table 63A of the RAM 63 (Act207). That is, "absence of printing job" of the record is updated to "presence of printing job". Thereafter, the CPU 61 returns the control process to the foregoing Act201.

Conversely, when it is determined in the foregoing Act201 that no new person is detected near the image forming apparatus 1 (NO in Act201), the CPU 61 determines whether the person who has been detected until now is not detected, that is, any person who has been detected until now becomes distant from the image forming apparatus 1 (Act208). When it is determined that any person is detected (YES in Act208), the CPU 61 returns the control process to the foregoing Act201.

Conversely, when it is determined in the foregoing Act208 that any person is not yet detected (NO in Act208), the CPU 61 discards the record corresponding to the person from the individual specifying table 63A of the RAM 63 (Act209). Then, the CPU 61 returns the control process to the foregoing Act201.

Figure 6:
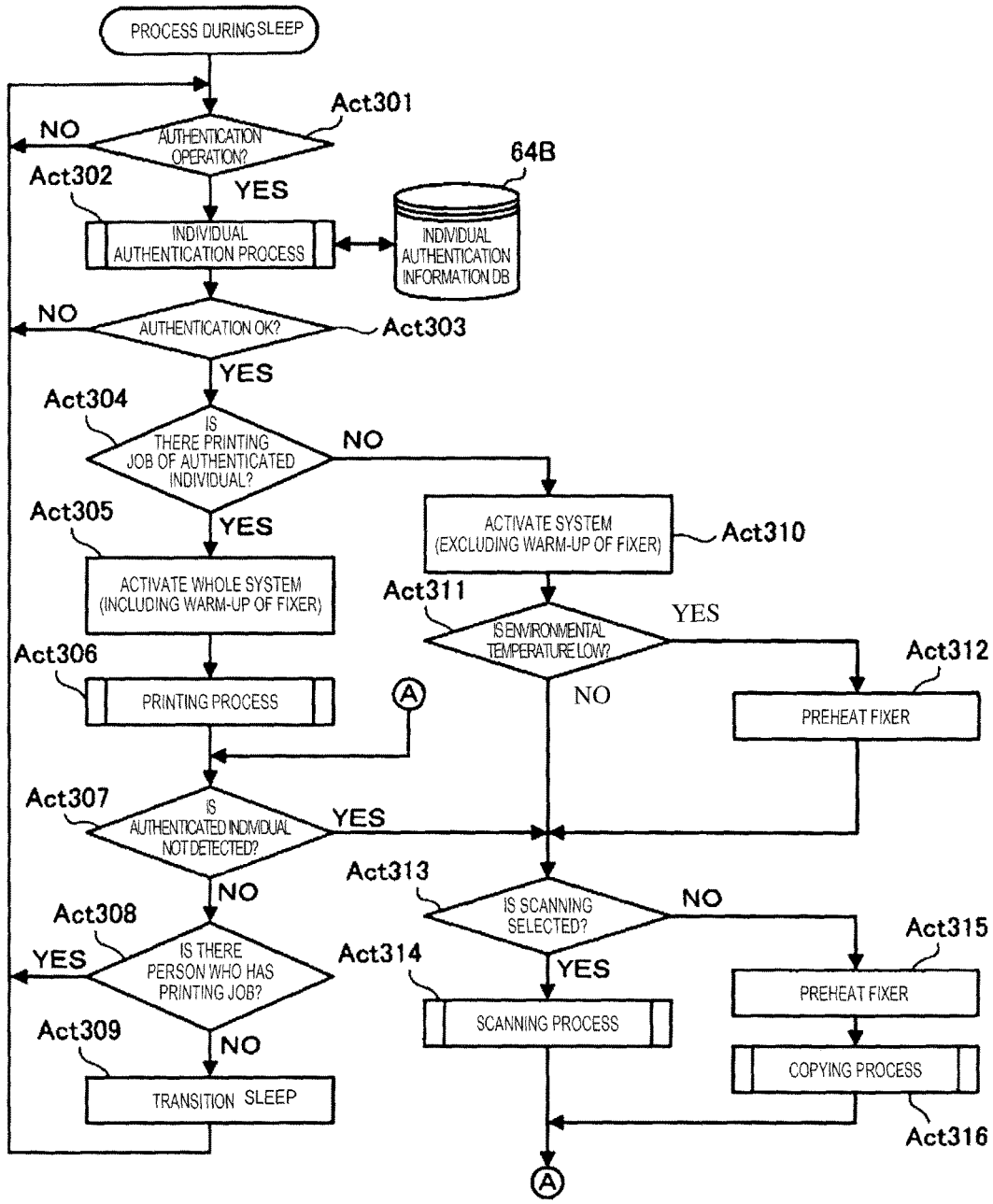
FIG. 6 is a flowchart illustrating an example of a process during sleep in the image forming apparatus according to at least a further embodiment.

FIG. 6 is a flowchart illustrating an example of a process during sleep performed by the CPU 61 of the image forming apparatus 1 according to the one or more second exemplary embodiments. The control process illustrated in the flowchart is executed in parallel to the person detection process illustrated in FIG. 5 when the image forming apparatus 1 enters the sleep mode. That is, when the image forming apparatus 1 enters the sleep mode, the CPU 61 starts the control process illustrated in FIG. 6 according to a control program stored in the ROM 62 or the nonvolatile memory 64.

When the image forming apparatus 1 enters the sleep mode, the CPU 61 waits for an individual authentication operation (Act301). When it is determined that the individual authentication operation is performed (YES in Act301), the CPU 61 performs the individual authentication process with reference to the individual authentication information DB 64B stored in the nonvolatile memory 64 (Act302). In the individual authentication process, the identification information which is referred to among the plurality of kinds of identification information registered in the individual authentication information DB 64B is determined based on stored content of the individual specifying table 63A of the RAM 63. That is, the identification information of the plurality of specified individuals is set as a target to perform the individual authentication. The CPU 61 determines whether to authenticate the individual who will use the image forming apparatus 1 as the result of the individual authentication process (Act303). When it is determined that the individual authentication may not be performed, that is, it is determined that any of the plurality of specified individuals is not registered as a user permitted to use the image forming apparatus 1 (NO in Act303), the CPU 61 returns the control process to the foregoing Act301.

Conversely, when it is determined in the foregoing Act303 that the individual authentication can be performed, that is, it is determined that one person among the plurality of specified individuals is registered as the user permitted to use the image forming apparatus 1 (YES in Act303), the CPU 61 determines whether there is a printing job of the individual, that is, whether a printing job corresponding to the authenticated individual is stored in the RAM 63, with reference to the individual specifying table 63A of the RAM 36 (Act304).

When it is determined that there is the printing job corresponding to the authenticated individual (YES in Act304), the CPU 61 activates the whole system (Act305). That is, the CPU 61 turns on power supply to the scanner unit 13, the ADF 14, the image forming unit 17, the transport unit 18, the display unit 20, the speaker 25, and the temperature measurement unit 27 to which the supply of the power has been stopped in the sleep mode. That is, the CPU 61 transitions each unit of the image forming apparatus 1 from the sleep state to the ready state. Thus, the fixer 46 of the image forming unit 17 is considered to be in a warm-up state in which the fixing rollers 46A are heated to a high temperature by the heater 46B. Thereafter, the CPU 61 performs a printing process suitable for the printing job of the authenticated individual (Act306).

After the printing ends, the CPU 61 determines whether the authenticated individual is not detected, that is, whether the record of the person is discarded from the individual specifying table 63A, with reference to the individual specifying table 63A of the RAM 36 (Act307). When it is determined that the person is not detected (NO in Act307), the CPU 61 determines whether there is a remaining person who has a printing job, that is, there is the record with "presence of printing job" in the individual specifying table 63A, with reference to the individual specifying table 63A of the RAM 63 (Act308). When it is determined that there is the remaining person who has a printing job (YES in Act308), the CPU 61 returns the control process to the foregoing Act301.

Conversely, when it is determined in the foregoing Act308 that there is no person who has a printing job (NO in Act308), the CPU 61 stops supplying power to the scanner unit 13, the ADF 14, the image forming unit 17, the transport unit 18, the display unit 20, the speaker 25, and the temperature measurement unit 27 to transition each unit to the sleep state (Act309). Thereafter, the CPU 61 returns the control process to the foregoing Act301.

When it is determined in the foregoing Act307 that the authenticated individual is still detected (YES in Act307), the CPU 61 causes the control process to proceed to Act313 to be described below. That is, on the assumption that the person who ends the printing and is not distant from the image forming apparatus 1 is the person attempting to perform a job other than the printing, that is, a scanning or copying job, the CPU 61 causes the process to proceed to a control process for the scanning or copying job.

When it is determined in the foregoing Act304 that there is no printing job of the authenticated individual (NO in Act304), the CPU 61 activates the system excluding at least the fixer 46 of the image forming unit 17 (Act310). That is, the CPU 61 maintains at least the fixer 46 including the heater 46B in the sleep state and transitions each unit excluding the fixer 46, that is, the states of the scanner unit 13, the ADF 14, the transport unit 18, the display unit 20, the speaker 25, and the temperature measurement unit 27 from the sleep state to the ready state.

Subsequently, the CPU 61 determines whether the current environmental temperature measured by the temperature measurement unit 27 is lower than a given temperature determined in advance (Act311). When it is determined that the environmental temperature is lower than the given temperature (YES in Act311), the CPU 61 switches the fixer 46 in the sleep state to the preheating state and causes the heater 46B to heat the fixing rollers 46A to a temperature lower than in the ready state (Act312). Conversely, when it is determined that the environmental temperature is equal to or greater than the given temperature (NO in Act311), the CPU 61 skips the control process of Act312.

Subsequently, the CPU 61 determines whether the authenticated individual selects the scanning operation, that is, an operation to instruct scanning, is input from the operation I/F 21 (Act313). When it is determined that the scanning operation is selected (YES in Act313), the CPU 61 performs the scanning operation (Act314). Thereafter, the CPU 61 returns the control process to the foregoing Act307 and determines whether the authenticated person becomes distant from the image forming apparatus 1.

Conversely, when it is determined in the foregoing Act313 that the scanning operation is not selected, that is, the copying operation is selected (NO in Act315), the CPU 61 switches the fixer 46 in the sleep state or the preheating state to the warm-up state and causes the heater 46B to heat the fixing rollers 46A to a high temperature (Act315). Then, the CPU 61 performs the copying operation (Act316). Thereafter, the CPU 61 returns the control process to the foregoing Act307 and determines whether the authenticated person becomes distant from the image forming apparatus 1.

According to the above-described one or more second exemplary embodiments, it is possible to obtain the image forming apparatus 1 that does not unnecessarily consume power even when the plurality of people are nearby.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus including an image forming unit configured to form an image on an image forming medium, an image reader configured to read the image, and a user interface configured to receive a user selection of scanning or copying and to perform printing, scanning, and copying, the apparatus comprising:
   a fixer that is installed in the image forming unit and includes a heater;
   a detector configured to detect a presence of an individual near the image forming apparatus during a sleep mode in which the image forming unit, the image reader, and the user interface enter a sleep state of non-conduction;
   an individual specifying circuit configured to specify the detected individual;
   a processor configured to determine whether there is a printing job corresponding to the specified individual; and
   a controller configured to warm up the heater by causing the fixer to transition from the sleep state to a ready state when there is the printing job and maintain the fixer in the sleep state when there is no printing job.

2. The apparatus according to claim 1, further comprising: an authentication circuit configured to authenticate the specified individual during the sleep mode,
   wherein the processor and the controller operate only when the authentication circuit authenticates the specified individual.

3. The apparatus according to claim 1,
   wherein when there is no printing job, the controller returns the image reader and the user interface from the sleep state to the ready state, and
   wherein when the user selection of scanning is received by the user interface in the ready state, the controller causes the image reader to read the image while maintaining the fixer in the sleep state.

4. The apparatus according to claim 1,
   wherein when there is no printing job, the controller returns the image reader and the user interface from the sleep state to the ready state, and
   wherein when the user selection of copying is received by the user interface in the ready state, the controller causes the image reader to read the image and causes the image forming unit to form the read image on the image forming medium by causing the image forming unit including the fixer to transition from the sleep state to the ready state and warming up the heater.

5. The apparatus according to claim 1, further comprising:
   a temperature sensor configured to measure an environmental temperature during the sleep mode,
   wherein when there is no printing job and the environmental temperature is lower than a set temperature, the controller causes the fixer to transition from the sleep state to a preheating state in which the heater is preheated in order to heat the fixer to a temperature lower than in the ready state.

6. The apparatus according to claim 1,
   wherein when the detector detects that the individual is a predetermined distance or more from a vicinity of the image forming apparatus, the individual specifying circuit discards a specifying result of the individual.

7. The apparatus according to claim 1,
   wherein when the detector detects a presence of plurality of individuals, the individual specifying circuit specifies each of the plurality of the individuals,
   wherein the processor determines whether there is a printing job corresponding to each of the specified individuals,
   wherein the image forming apparatus further comprises an authentication circuit that performs individual authentication, and
   wherein the controller determines whether the fixer is caused to transition from the sleep state to the ready state depending on whether there is the printing job corresponding to the authenticated individual.

8. The apparatus according to claim 7,
   wherein the individual specifying circuit registers each of the specified individuals in an individual specifying table,
   wherein the processor determines whether there is the printing job corresponding to each of the individuals registered in the individual specifying table and registers a determination result in the individual specifying table, and
   wherein the controller confirms whether there is the printing job corresponding to the authenticated individual with the individual specifying table.

9. The apparatus according to claim 8,
   wherein when the detector detects that the authenticated individual is a predetermined distance or more from a vicinity of the image forming apparatus, the individual specifying circuit discards the authenticated individual from the individual specifying table.

10. A method of controlling a return from a sleep mode in an image forming apparatus including an image forming unit that includes a fixer including a heater and forms an image on an image forming medium, an image reader that reads an image, and a user interface that receives a user selection of scanning or copying and is configured to perform operations including printing, scanning, and copying, the method comprising:

specifying a detected individual when a presence of the individual near the image forming apparatus is detected during a sleep mode in which the image forming unit, the image reader, and the user interface enter a sleep state of non-conduction;

determining whether there is a printing job corresponding to the specified individual;

warming up the heater by causing the fixer to transition from the sleep state to a ready state when there is the printing job; and maintaining the fixer in the sleep state when there is no printing job.

11. The method according to claim 10, further comprising:

authenticating the specified individual during the sleep mode, and determining whether there is the printing job and warming up the heater only once the specified individual is authenticated.

12. The method according to claim 10, further comprising:

when there is no printing job, returning the image reader and the user interface from the sleep state to the ready state, and when the user selection of scanning is received by the user interface in the ready state, causing the image reader to read the image while maintaining the fixer in the sleep state.

13. The method according to claim 10, further comprising:

when there is no printing job, returning the image reader and the user interface from the sleep state to the ready state, and when the user selection of copying is received by the user interface in the ready state, causing the image reader to read the image and causing the image forming unit to form the read image on the image forming medium by causing the image forming unit including the fixer to transition from the sleep state to the ready state and warming up the heater.

14. The method according to claim 10, further comprising:

measuring an environmental temperature during the sleep mode, and when there is no printing job and the environmental temperature is lower than a set temperature, causing the fixer to transition from the sleep state to a preheating state in which the heater is preheated in order to heat the fixer to a temperature lower than in the ready state.

15. The method according to claim 10, further comprising:

upon detecting that the individual reaches a predetermined distance or more from a vicinity of the image forming apparatus, discarding a specifying result of the individual.

16. The method according to claim 10, further comprising:

upon detecting a presence of a plurality of individuals, specifying each of the plurality of the individuals, determining whether there is a printing job corresponding to each of the specified individuals, performing individual authentication of each of the individuals, and determining whether the fixer is caused to transition from the sleep state to the ready state depending on whether there is the printing job corresponding to the authenticated individual.

17. The method according to claim 16, further comprising:

registering each of the specified individuals in an individual specifying table, determining whether there is the printing job corresponding to each of the individuals registered in the individual specifying table and registering a determination result in the individual specifying table, and confirming whether there is the printing job corresponding to the authenticated individual with the individual specifying table.

18. The method according to claim 17, further comprising:

upon detecting that the authenticated individual is a predetermined distance or more from a vicinity of the image forming apparatus, discarding the authenticated individual from the individual specifying table.

* * * * *